(12) United States Patent
Markevitch et al.

(10) Patent No.: US 7,721,151 B2
(45) Date of Patent: May 18, 2010

(54) SELECTIVE ERROR RECOVERY OF PROCESSING COMPLEX USING PRIVILEGE-LEVEL ERROR DISCRIMINATION

(75) Inventors: James A. Markevitch, Palo Alto, CA (US); Earl T. Cohen, Fremont, CA (US); John A. Fingerhut, Mission Viejo, CA (US); Johannes M. Hoerler, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 11/216,437

(22) Filed: Aug. 30, 2005

(65) Prior Publication Data

US 2007/0050671 A1 Mar. 1, 2007

(51) Int. Cl.
*G06F 11/00* (2006.01)
(52) U.S. Cl. .............................. 714/23; 714/21; 714/49
(58) Field of Classification Search .................... 714/21, 714/23, 49
See application file for complete search history.

(56) References Cited

U.S. PATENT DOCUMENTS

| | | | | | |
|---|---|---|---|---|---|
| 5,113,494 | A | * | 5/1992 | Menendez et al. | 345/502 |
| 5,740,357 | A | * | 4/1998 | Gardiner et al. | 714/57 |
| 5,900,025 | A | * | 5/1999 | Sollars | 712/248 |
| 6,163,844 | A | * | 12/2000 | Duncan et al. | 726/3 |
| 6,418,542 | B1 | * | 7/2002 | Yeager | 714/38 |
| 6,715,077 | B1 | * | 3/2004 | Vasudevan et al. | 713/191 |
| 6,745,350 | B1 | * | 6/2004 | Cline et al. | 714/49 |
| 7,321,989 | B2 | * | 1/2008 | Grayver | 714/38 |
| 2005/0240936 | A1 | * | 10/2005 | Jones et al. | 718/107 |
| 2005/0246461 | A1 | * | 11/2005 | Accapadi et al. | 710/200 |
| 2006/0136919 | A1 | * | 6/2006 | Aingaran et al. | 718/100 |

\* cited by examiner

*Primary Examiner*—Joshua A Lohn
(74) *Attorney, Agent, or Firm*—Marger Johnson & McCollom, P.C.

(57) ABSTRACT

An apparatus has at least one processing unit to generate a request having a request privilege level. At least one resource exists in the apparatus to receive the request and determine if the request is allowable. The apparatus includes an error handler that determines the nature of an error and performs a reset based upon the privilege level of the request that cause the error.

30 Claims, 3 Drawing Sheets

SELECTIVE ERROR RECOVERY OF PROCESSING COMPLEX USING PRIVILEGE-LEVEL ERROR DISCRIMINATION

BACKGROUND

Computing devices have become increasingly complex. The hardware and software implementations within these devices are susceptible to software errors and hardware soft errors due to this complexity. A hardware soft error may be best understood as a transient hardware error that is not due to a defect in the hardware, but due to some condition that arose and caused an error that may not be repeatable; these may also be referred to as errors during processing.

In single processor systems, protections against these kinds of errors can be centrally located, which makes error recovery more controllable and simpler to implement. In multiple processor systems, the error recovery is much more complex, as there is no central place in which protections are located. This is further exacerbated by the need to maintain state information for multiple execution threads for each of one or more processors. When an error occurs, currently, all of the execution threads for all of the processors must be reloaded together with their entire configuration, which may include large amounts of data. It must be noted that the term 'reloaded' may also include being reset, re-initialized, and/or restarted.

In networks where other devices rely upon these complex devices to be available, the downtime in reloading all of the threads for all of the processors can become visible to the other devices. This in turn may slow or bring down the network as the device reloads.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
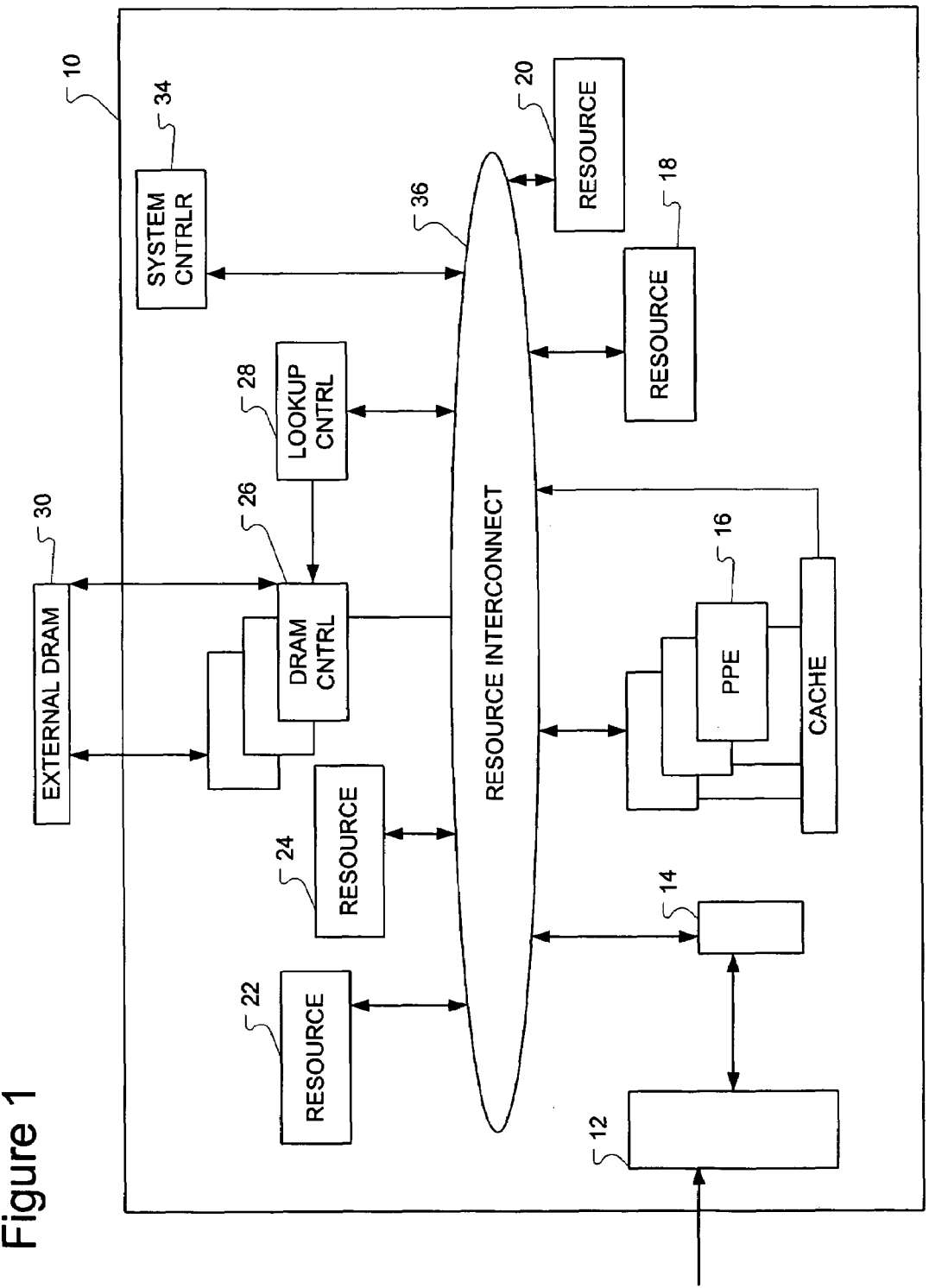
FIG. 1 shows an embodiment of an apparatus having processing units and resources.

FIG. 1 shows an embodiment of an apparatus 10 having multiple processing units for performing tasks. As will be discussed further, this is only one embodiment used for discussion purposes and no intention of limiting the scope of the claims exists or should be inferred. This particular device is shown as a 'packet processor' type of network device that receives data in the form of packets and performs the necessary processing on those packets.

An input buffer 12 receives the packets to be processed. A scheduler, controller, or prioritizer 14 assigns a packet to be processed to one of an array of packet processing elements (PPE) 16. The controller 14 determines which PPE is available and may divide the packets or the tasks up among the available PPEs. The connection between the controller 14 and the PPE array 16 may be through a direct connection, or through an interconnection 36 that connects all of the components of the apparatus together for communications.

In order to perform the assigned tasks, the PPEs may distribute requests out to a wide assortment of resources. Some examples of resources may include one or more DRAM (dynamic random access memory) controllers 26, or a look up controller 28, as examples. There may be other resources, such as ALUs (arithmetic logic units), statistic-accumulating units, state machines, etc. that are represented in general as resources 18, 20, 22 and 24. In addition, there may be resources such as the DRAM controller 26 that control external resources such as the external DRAM 30. There may also be a system-level entity of some kind, a system controller or processor 34. It must be noted that while this is referred to as a processor, it may not be a processor, but a controller, an application specific integrated circuit (ASIC), etc. The system processor 34 is merely another entity capable of handling error processing tasks, as are the PPEs 16. The system processor 34 could also be external to the apparatus 10, in which case it could still be interfaced to the interconnection 36, perhaps via some type of bridge such as from PCI or Hyper-Transport.

For ease of discussion, the processors and/or processing elements, resources, threads and associated components of the apparatus will be referred to here as entities.

It must be noted that the apparatus of FIG. 1 is just one example in which embodiments of the invention may be applied. Because of its complexity, the advantages of applying embodiments of the invention are more readily apparent. However, the embodiments of the invention may be applied in much simpler apparatus, including those having only one processing unit and one resource. Further the processing unit may be any type of processor, including a general-purpose processor or a specific-use digital signal processor.

Returning to FIG. 1, each of the PPE processing units can, in some embodiments, handle multiple threads of execution. Having multiple threads of execution in each of an array of multiple processors, it becomes apparent that an error that causes the entire system to be reset will take a relatively long time for recovery. It is possible to discriminate between errors to allow a processing unit or a resource to determine the severity of the error, also referred to as the error level, and the resulting response necessary. In one embodiment, a privilege level is assigned to each request by the processing unit.

Figure 2:
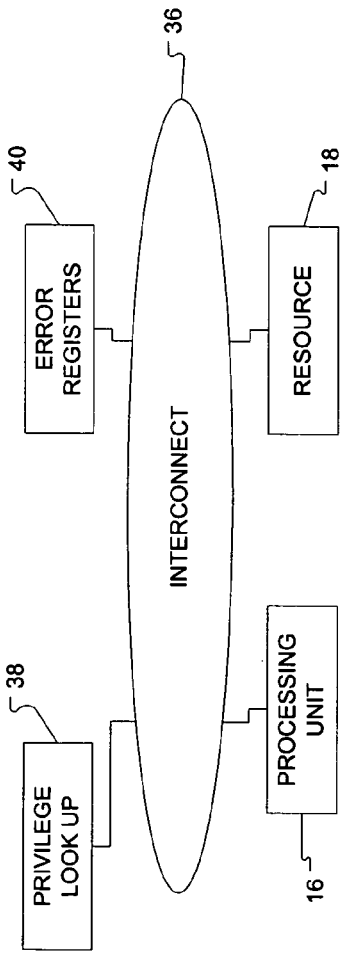
FIG. 2 shows a more detailed embodiment of an apparatus.

A more detailed view of a processing unit and resource coupled through an interconnect is shown in FIG. 2. The processing unit 16 may be part of an apparatus as in FIG. 1, or it may be a single-processor apparatus, including one in which the single processor can handle multiple threads of execution.

The processing unit 16 and the resource 18 are connected together through the interconnect 36. In one embodiment, the interconnect may be a cross-bar switch. In another embodiment, there could be a direct connection between each processing unit 16 and one or more resources 18. The processing unit 16 may receive a task from the scheduler of FIG. 1, or it may receive the tasks directly from incoming data. The processing unit 16 generates a request to have some operation performed by a resource. This request, its operation (execution), and the eventual response by the resource are referred to in some instances as a transaction.

In addition to the request, the processing unit transmits other information, collectively referred to as transaction attributes or request attributes, associated with the request to the resource. For example, the transaction attributes may include a privilege level, a thread identifier, a processing unit identifier and a type of operation. The privilege level may be assigned depending upon the other attributes of the transaction listed above, or upon some other attribute of the transaction, or may be based upon the type of task the processing unit is currently carrying out. The privilege level may be simply identified as being one of two levels, privileged or non-privileged. The level could then be communicated by the setting or clearing of a particular bit in a request header, where a 1 indicates a privileged operation and a 0 indicates a non-privileged operation. The determination of the number of privilege levels and how they are communicated is left up to the system designer.

The thread identifier is assigned to the request based upon for which thread of execution the request is generated. The processing unit identifier is determined by the processing unit generating the request and allows the resource to know to which processing unit the result and any status, including error indications, should be transmitted. In some embodiments, particularly those employing hardware-based threads, the thread identifier and the processing unit identifier may be unified. The type of operation includes such things as memory writes, reads, table updates, etc. The transaction attributes are typically determined by the source, destination and requested operation.

Upon receiving the request, the resource determines if the transaction is allowable. It may do so by using some or all of the request attributes when performing a lookup in a privilege lookup table. If there is a mismatch between any of the attributes and the privilege level, for example, the resource will identify the request as a violation or an unallowable transaction. The resource may then transmit an error message to the originating processing unit, to other entities in the system, or both, to inform them that it could not perform the requested operation. The error message might include one or more of the type of error, some or all of the request attributes, or an error level. A violation may result when the privilege level for the request does not match that already determined for that processing unit, the type of operation, the thread identifiers, etc.

The privilege lookup table may reside centrally and be accessible by the resource via the interconnect. However, it is probably more efficient and more general to allow each resource to have its own independent table. The privilege lookup table 38 is shown separate from the resource in FIG. 2 merely for ease of discussion.

Upon determining that a particular transaction is not-allowable for whatever reason, the resource 18 may transmit an error message to the originating processing unit 16. This transmission may be a direct communication sent directly to the port on the processing unit through the interconnect, or could comprise an error code or the entire error message being written into an error register or registers 40 that are monitored by the processing unit or another entity in the system. Both of these techniques, as well as other modes of communicating error conditions to the originating processing unit or other entities in the system, are considered here as 'transmitting an error message.'

For example, the processing unit receives data that adds a new device onto the network, requiring an update of the routing tables, and sends a table-update request to the appropriate resource. The resource determines if the request is a violation by accessing the look-up table that associates the various transaction attributes with each other. For example, a routing table update operation requested by a processing unit may only be performed if the privilege level is high. If the request comes in and the privilege level is low, that request is denied and an error message is generated indicating such. Discussion of this type of occurrence will be continued with regard to FIGS. 3-5.

Figure 3:
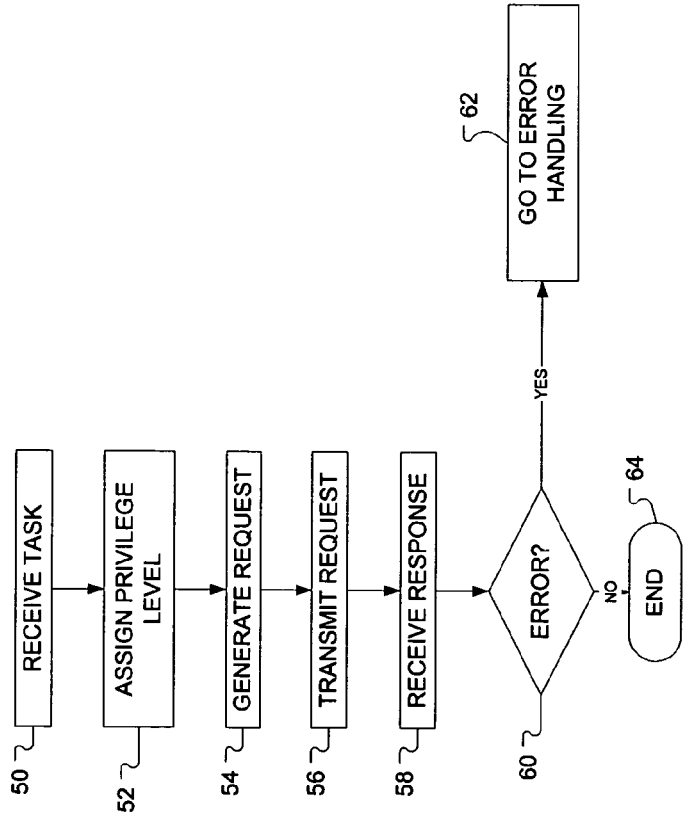
FIG. 3 shows a flowchart of an embodiment of a method of generating a request from a processor.

One possible reaction to an error is to reset some or all of the entities in the system in order to 'clear' the error condition and resume normal operation. Thus, the reset may be applied to a thread, the processor associated with the thread, the resource that detected the error, a subset of all of the threads and processors and resources associated with a particular or lower privilege level, or the entire system. In FIG. 3, the process is that viewed from the processing unit perspective. At 50, the processing unit receives a task. At 52, the processing unit assigns a privilege level and generates a request at 54. These two processes may occur simultaneously, but are separated here for clarity. The request is transmitted to the resource at 56.

At 58, a response is received. This is just one embodiment, as will be discussed further. At 60, the processing unit determines whether the response is an error. If the response is not an error at 60, the response is a result of the requested transaction and the process ends at 64. The processing unit may continue at 52 with further requests as part of the same task, or may later be given a new task at 50. If the response is an error at 60, the processing may then hand off the error handling at 62 to whichever entity in the system is to handle the error, as will be discussed in FIG. 5. Depending on the nature of the error and the error handling, the processing unit might continue with another request for the current task at 52, or it may later be given a new task at 50, or it may be reset prior to being given a new task at 50.

If the processing unit determines that it is handling the error, it must determine the error level. This may be provided from the resource based upon the privilege table at the resource, or may be determined from other information in the error message, or other state in the processing unit. If the error level is low, only that particular thread may be reset. If the error level is intermediate, all of the threads having the same or possibly a lower attribute, such as the same or lower privilege level as that of the failing transaction, may be reset. In this manner, where the privilege level in combination with the error level determines if the thread or processing unit is to be reset, it can be seen that assigning a privilege level allows for a finer granularity in reset, reducing the amount of information that needs to be reloaded for some errors, in turn reducing device downtime. Finally, if the error level is high, the entire system may be reset. This will generally include stopping execution of all threads, resetting all processing units and all resources.

Figure 4:
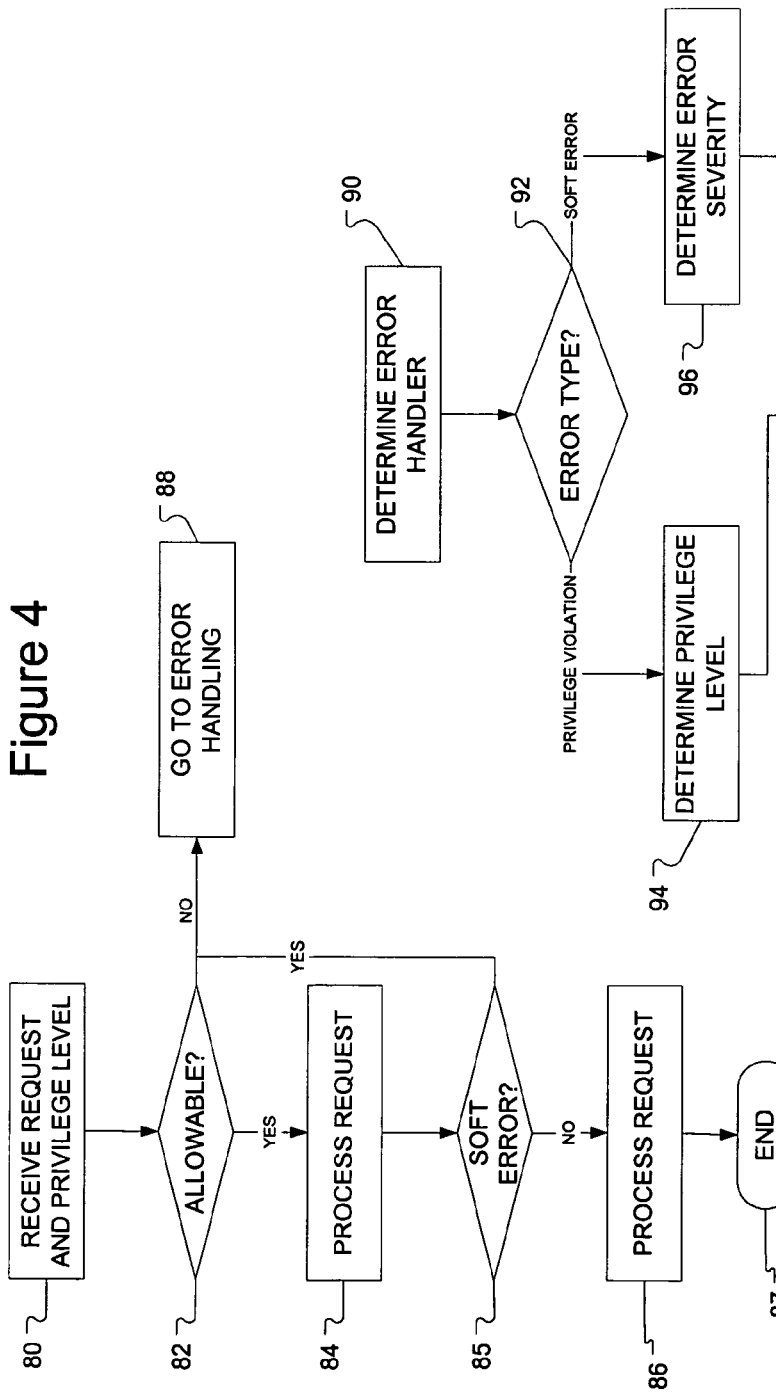
FIG. 4 shows a flowchart of an embodiment of a method of processing a request at a resource.

An embodiment of a process for processing requests at a resource is shown in FIG. 4. The resource receives a request and the request privilege level at 80. If the request is allowable at 82, the request is processed at 84. Processing the request may also result in an error, such as a soft error; this is checked at 85. A soft error, as discussed above, may be best understood as a transient hardware error that is not due to a defect in the hardware, but due to some condition that arose and caused an error that may not be repeatable. Other errors that may occur during processing include software consistency check errors and illegal address errors, as examples.

If there was no error during processing, the process goes to 86 to send a response, and then ends at 87. If the process is not allowable at 82, or if there was an error detected at 85, the process proceeds to 88 and is handed off to the error handler as will be discussed with regard to FIG. 5. Particularly in the case where the resource is not the error handler, the resource at 88 may send an error response (an error message) to the requesting processor or to other entities in the system.

Figure 5:
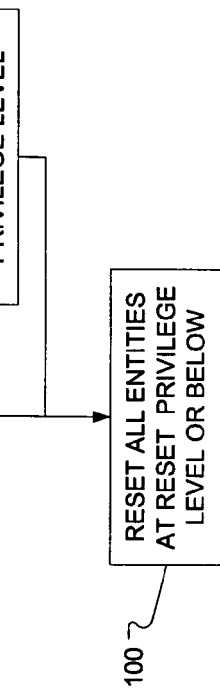
FIG. 5 shows a flowchart of an embodiment of a method to handle errors.

FIG. 5 shows a flowchart of an embodiment of handling errors. At 90, the error handler is determined. The error handler may be the resource that detected an error, a processor that received an error response from the resource, or a system-level entity, such as the system processor 34 of FIG. 1. The determination of whether the resource, the processing unit, or some other entity is responsible for handling a given error could be a function of attributes in the request, of information in the privilege lookup table, a function of the resource type, or a system-level function.

At 92, it may be advantageous to determine the nature of the error, such as whether the error is a result of a privilege violation detected by employing the privilege lookup table, or if the error is a soft error, such as a transient parity error. If the error is a privilege violation, the process moves to 94 at which point the privilege level of the request causing the error is determined. At 100, all entities in the system, including processors, resources and threads that are at that privilege level and below may be reset.

For example, the resource receives a request that is a privilege violation. The resource transmits an error message to one or more other entities in the system identifying the error. The entity to handle the error may be based upon the privilege level, the nature of the error, the severity of the error, or some other attribute. It is also possible for multiple entities to handle different aspects of the error. For example, a system processor might fix the error by updating a corrupted table entry, whereas the requesting processor might reset itself. In some embodiments, if a privilege violation is the cause of the error, and the privilege level of the request is at a particular level, all entities at that level or below will be reset.

Returning to 92, the error may be a soft error. In this case, the severity of the error may also need to be determined as shown at 96. The privilege lookup table may contain this information, where the error level is based upon the privilege level, or there may be some other table or storage that contains this information. The error level may determine at what privilege level the reset is needed. The reset privilege level is then determined at 98, and the reset is performed at 100.

In some embodiments, there may be other ways of handling the error which are not shown in FIG. 5. For example, a transient error might just be retried by the requesting processor. A very low error level might just result in a current packet that is being processed being marked as being in error, or being dropped. A combination of the privilege level and the error level are combined in order to determine the nature of the error handling. One key point, though, is that the resource has the ability to determine the error level and that in turn may be based on the request attributes, including the privilege level.

It must be noted that the process of determining the privilege level for a reset is not the same as the process of assigning the privilege level. In this instance, determining the privilege level is a matter of analyzing the originating request and determining from the request attributes and the type of error what the desired reset privilege level is. For example, a parity error in one type of data structure might be determined to have a low error level and thus a low reset privilege level and only reset the requesting processor, but a parity error in a global data structure might have a high error level and thus a high reset privilege level and cause the entire system to be reset.

By limiting the number of errors that require a complete reset of the system, and the subsequent reload of all of the data associated with all of the threads, system efficiency is improved. In the case of low or intermediate level errors, where only one entity such as a thread is reset, or some limited number of entities are reset, the other entities in the apparatus continue to operate. This may contain the errors such that there is no perceived downtime by other devices networked with the device disclosed here.

There are several modifications and adaptations that could be made to the above methods and apparatus. As mentioned above, there can be any number of processing units and resources and the connections between them could be made any number of ways. There are many options as to the location and constitution of the privilege lookup table, the error notification process, and the error handler or handlers.

It is possible that the resource only handles certain levels of privilege violations or soft error severity, the requesting processor handles a different set, and the system processor still another set. Similarly, it may be that an error occurs that causes the error resolution to be distributed between the processing unit, the resource and a system processor.

In some instances, the resource may detect an error during the course of executing the task, not just during the privilege lookup process. For example, the resource may receive a parity error during an operation. The request privilege level or other attribute may determine which entity handles the error, the resource or the processor, and how the error is resolved such as by determining what level of reset is performed.

In other instances, the processor itself may detect a 'soft' error, which is a transient hardware error not due to a defect in the hardware but by some transient condition. In this case, the processor may determine which entity handles the error, and the form of the error resolution. Similar to the way in which soft errors are handled by resources, a current privilege level of execution of the processor may be used to determine the severity of such a processor soft error, and this may in turn be used to determine which portions of the system are to be reset due to this error. The error may be detected by an error detector, similar to the error handler, or by an error detection process in the processor or the resource. A controller, either integral to the processor, or a system or apparatus controller such as 34 in FIG. 1 may handle the reset process.

For example, if the processor had a high privilege level at the time of the soft error, it may be necessary to reset the entire system since it could be unknown what corruption might have occurred due to errant behavior of the processor while it had the high privilege level. If the processor had a low privilege level, it would be known due to privilege-based protection at the resources that any corruption would be local to this processor and its current task, and only this one processor might need to be reset.

In this manner, a multi-threaded processing apparatus, made up of from one to N processors and one to N resources, has a finer control of the error identification and recovery process. This will reduce the amount of downtime needed to recovery from errors, and make the apparatus available as needed to other apparatus and networks.

Thus, although there has been described to this point a particular embodiment for a method and apparatus to provide privilege access to resources, it is not intended that such specific references be considered as limitations upon the scope of this invention except in-so-far as set forth in the following claims.

What is claimed is:

1. A method of handling errors, comprising:
    detecting an error in a request being processed;
    determining a request privilege level associated with the request;
    performing a reset in response to the privilege level;
    determining a severity of the error;
    determining a reset privilege level associated with the severity of the error; and performing a reset of entities having a privilege level that is the same as or lower than the reset privilege level.

2. The method of claim 1, detecting an error further comprising detecting a privilege violation at a resource.

3. The method of claim 1, performing a reset further comprising performing, based at least in part upon the privilege level associated with the request, one of the group consisting of: resetting a thread, resetting a set of threads, resetting a processor, resetting a set of processors, and resetting a system.

4. The method of claim 1, detecting an error further comprising detecting an error during processing of the request.

5. The method of claim 4, detecting an error during processing further comprising detecting an error during processing at one of either a resource or a processor.

6. The method of claim 1, performing a reset in response to the privilege level further comprising resetting entities having a same or lower request privilege error as the request privilege level associated with the request.

7. The method of claim 1, performing a reset of entities further comprising performing at least one of the group consisting of: resetting a thread, resetting a set of threads, resetting a processor, resetting a set of processors, and resetting a system.

8. An apparatus, comprising:
a processing unit configured to generate and transmit a request, the request comprising a request privilege level and a processing unit identifier;
a resource configured to receive the request, perform a lookup in a privilege lookup table, and determine whether the request is allowable based at least in part on the request privilege level and the lookup in the privilege lookup table; and
an error handler configured to determine an error type of an error corresponding to the request, determine a severity corresponding to the error, determine a reset privilege level associated with the severity of the error, and reset entities within the apparatus based at least in part on at least one of a group consisting of the error type, the severity of the error, and the reset privilege level.

9. The apparatus of claim 8, wherein the resource comprises the error handler.

10. The apparatus of claim 8, wherein the error handler comprises a processor external to the resource.

11. The apparatus of claim 8, wherein the error handler comprises a system controller.

12. The apparatus of claim 8, wherein the error handler is configured to determine the reset privilege level responsive to a determination by the error handler that the request has a privilege violation error type.

13. The apparatus of claim 12, wherein the determination by the error handler that the request has a privilege violation error type is responsive to a determination by the resource that the request is not allowable based at least in part on the lookup in the reset privilege lookup table performed by the resource.

14. The apparatus of claim 12, wherein the error handler is further configured to perform at least one of a group consisting of resetting a thread from which the request originated, resetting the processing unit that generated and transmitted the request, resetting all threads and all processing units having a reset privilege level the same as or lower than the reset privilege level determined by the error handler, and resetting the apparatus.

15. The apparatus of claim 12, wherein the reset privilege level determined by the error handler is the request privilege level.

16. The apparatus of claim 8, wherein the error handler is configured to determine the severity corresponding to the error responsive to a determination by the error handler that the request has a soft error error type.

17. The apparatus of claim 16, wherein the error is one of a group consisting of a software consistency check error and an illegal address error.

18. The apparatus of claim 16, wherein the error handler is configured to determine the reset privilege level responsive to a determination by the error handler that the request has a privilege violation error type.

19. The apparatus of claim 18, wherein the error handler is further configured to perform at least one of a group consisting of resetting a thread from which the request originated, resetting the processing unit that generated and transmitted the request, resetting all threads and all processing units having a reset privilege level the same as or lower than the reset privilege level determined by the error handler, and resetting the apparatus.

20. The apparatus of claim 18, wherein the reset privilege level determined by the error handler is the request privilege level.

21. The apparatus of claim 8, further comprising an interconnect network for carrying requests from the processing unit to the resource.

22. The apparatus of claim 8, wherein the processing unit identifier comprises a processor identifier and a thread identifier.

23. The apparatus of claim 8, wherein the resource is further configured to generate and transmit to the processing unit an error message responsive to an identification of the error corresponding to the request.

24. The apparatus of claim 8, further comprising a memory to store associations between one or more of a group consisting of privilege levels, processing unit identifiers, types of operations, thread identifiers, and error levels.

25. A method, comprising:
a first processing unit within a system generating a request, the request comprising a request privilege level and a processing unit identifier;
the first processing unit transmitting the request to a second processing unit within the system;
the second processing unit receiving the request from the first processing unit;
the second processing unit processing the request, wherein the processing comprises the second processing unit determining whether the resource is allowable based at least in part on the request privilege level;
the second processing unit determining whether an error corresponding to the request has occurred during the processing of the request;
responsive to the second processing unit determining that an error corresponding to the request has occurred, an error handler within the system determining a severity corresponding to the error and determining a reset privilege level associated with the severity of the error; and
the error handler resetting at least one of the first processing unit, the second processing unit, and the entire system based at least in part on the reset privilege level.

26. The method of claim 25, further comprising the second processing unit performing a lookup in a privilege lookup table, wherein the second processing unit determining whether the resource is allowable is further based at least in part on the lookup in the privilege lookup table.

27. The method of claim 25, further comprising the error handler determining an error type corresponding to the identified error.

28. The method of claim 27, further comprising the error handler determining the severity of the error based on the error handler determining that the error is of a soft error error type.

29. The method of claim 25, wherein the error handler resetting at least one of the first processing unit, the second processing unit, and the entire system comprises the error handler resetting all entities within the system that have a privilege level at or below the reset privilege level.

30. The method of claim 25, wherein the second processing unit comprises a resource.

* * * * *